(12) United States Patent
Chung et al.

(10) Patent No.: US 8,316,748 B2
(45) Date of Patent: Nov. 27, 2012

(54) TABLE SAW WITH ALIGNMENT PLATE

(75) Inventors: Brian Hyuk Joon Chung, Schaumburg, IL (US); Robert S. Doumani, Hoffman Estates, IL (US)

(73) Assignee: Robert Bosch GmbH, Stuttgart (DE)

( * ) Notice: Subject to any disclaimer, the term of this patent is extended or adjusted under 35 U.S.C. 154(b) by 523 days.

(21) Appl. No.: 12/548,035

(22) Filed: Aug. 26, 2009

(65) Prior Publication Data
US 2011/0048206 A1 Mar. 3, 2011

(51) Int. Cl.
*B23D 47/08* (2006.01)
*B27B 5/22* (2006.01)
*B27B 5/29* (2006.01)
*B27G 19/02* (2006.01)

(52) U.S. Cl. ............... 83/477.2; 83/478; 83/564; 83/58

(58) Field of Classification Search .............. 83/477.2, 83/62.1, 58, 471.3, DIG. 1, 471.2, 581, 478, 83/490, 663, 781; 144/384, 391, 427, 154.5, 144/356; 324/688, 661; 318/16, 480; 340/686.5, 340/686.6, 532

See application file for complete search history.

(56) References Cited

U.S. PATENT DOCUMENTS

| | | | |
|---|---|---|---|
| 4,161,272 A | 7/1979 | Brockl | |
| 4,616,447 A | 10/1986 | Haas et al. | |
| 5,676,319 A | 10/1997 | Stiggins et al. | |
| 6,536,536 B1 | 3/2003 | Gass et al. | |
| 6,813,983 B2 | 11/2004 | Gass et al. | |
| 6,826,988 B2 | 12/2004 | Gass et al. | |
| 6,834,730 B2 | 12/2004 | Gass et al. | |
| 6,857,345 B2 | 2/2005 | Gass et al. | |
| 6,877,410 B2 | 4/2005 | Gass et al. | |
| 6,880,440 B2 | 4/2005 | Gass et al. | |
| 6,920,814 B2 | 7/2005 | Gass et al. | |
| 6,922,153 B2 | 7/2005 | Pierga et al. | |
| 6,945,148 B2 | 9/2005 | Gass et al. | |

(Continued)

FOREIGN PATENT DOCUMENTS

DE 20007037 7/2000

(Continued)

OTHER PUBLICATIONS

Photograph of Mafell Erika 70Ec Pull-Push saw, downloaded Oct. 29, 2009 from http://www.maschinensucher.de/ma2/bilderanzeigen-A600704-1-english.html.

*Primary Examiner* — Ghassem Alie
(74) *Attorney, Agent, or Firm* — Maginot, Moore & Beck

(57) ABSTRACT

A power tool in one embodiment includes a latch hold mechanism, a swing arm pivotable about a pivot along a swing arm path, at least one alignment plate positioned adjacent to a portion of the swing arm when the swing arm is in a first position, a latch pin movable between a first latch pin position whereat the swing arm is biased against the at least one alignment plate and a second latch pin position whereat the swing arm is not biased by the latch pin, an actuating device configured to transfer a force to the swing arm resulting in a bias on the latch pin in a direction toward the second latch pin position, and a control system configured to control the actuating device to transfer a force to the swing arm when the swing arm is maintained at the first swing arm position.

18 Claims, 14 Drawing Sheets

U.S. PATENT DOCUMENTS

| | | | |
|---|---|---|---|
| 6,945,149 B2 | 9/2005 | Gass et al. |
| 6,957,601 B2 | 10/2005 | Gass et al. |
| 6,994,004 B2 | 2/2006 | Gass et al. |
| 6,997,090 B2 | 2/2006 | Gass et al. |
| 7,000,514 B2 | 2/2006 | Gass et al. |
| 7,024,975 B2 | 4/2006 | Gass et al. |
| 7,029,384 B2 | 4/2006 | Steimel et al. |
| 7,055,417 B1 | 6/2006 | Gass |
| 7,077,039 B2 | 7/2006 | Gass et al. |
| 7,093,668 B2 | 8/2006 | Gass et al. |
| 7,098,800 B2 | 8/2006 | Gass |
| 7,100,483 B2 | 9/2006 | Gass et al. |
| 7,121,358 B2 | 10/2006 | Gass et al. |
| 7,137,326 B2 | 11/2006 | Gass et al. |
| 7,171,879 B2 | 2/2007 | Gass et al. |
| 7,197,969 B2 | 4/2007 | Gass et al. |
| 7,210,383 B2 | 5/2007 | Gass et al |
| 7,225,712 B2 | 6/2007 | Gass et al. |
| 7,228,772 B2 | 6/2007 | Gass |
| 7,231,856 B2 | 6/2007 | Gass et al. |
| 7,284,467 B2 | 10/2007 | Gass et al. |
| 7,290,472 B2 | 11/2007 | Gass et al. |
| 7,290,967 B2 | 11/2007 | Steimel et al. |
| 7,308,843 B2 | 12/2007 | Gass et al. |
| 7,328,752 B2 | 2/2008 | Gass et al. |
| 7,347,131 B2 | 3/2008 | Gass |
| 7,350,444 B2 | 4/2008 | Gass et al. |
| 7,350,445 B2 | 4/2008 | Gass et al. |
| 7,353,737 B2 | 4/2008 | Gass et al. |
| 7,357,056 B2 | 4/2008 | Gass et al. |
| 7,359,174 B2 | 4/2008 | Gass |
| 7,377,199 B2 | 5/2008 | Gass et al. |
| 7,421,315 B2 | 9/2008 | Gass et al. |
| 7,472,634 B2 | 1/2009 | Gass et al. |
| 7,475,542 B2 | 1/2009 | Borg et al. |
| 7,481,140 B2 | 1/2009 | Gass et al. |
| 7,509,899 B2 | 3/2009 | Gass et al. |
| 7,525,055 B2 | 4/2009 | Gass et al. |
| 7,536,238 B2 | 5/2009 | Gass |
| 7,540,334 B2 | 6/2009 | Gass et al. |
| 7,591,210 B2 | 9/2009 | Gass et al. |
| 7,600,455 B2 | 10/2009 | Gass et al. |
| 7,628,101 B1 * | 12/2009 | Knapp et al. ................ 83/62.1 |
| 2004/0159198 A1 | 8/2004 | Peot et al. |
| 2005/0166736 A1 * | 8/2005 | Gass et al. ................ 83/477.2 |

FOREIGN PATENT DOCUMENTS

DE          202004012468        11/2004

* cited by examiner

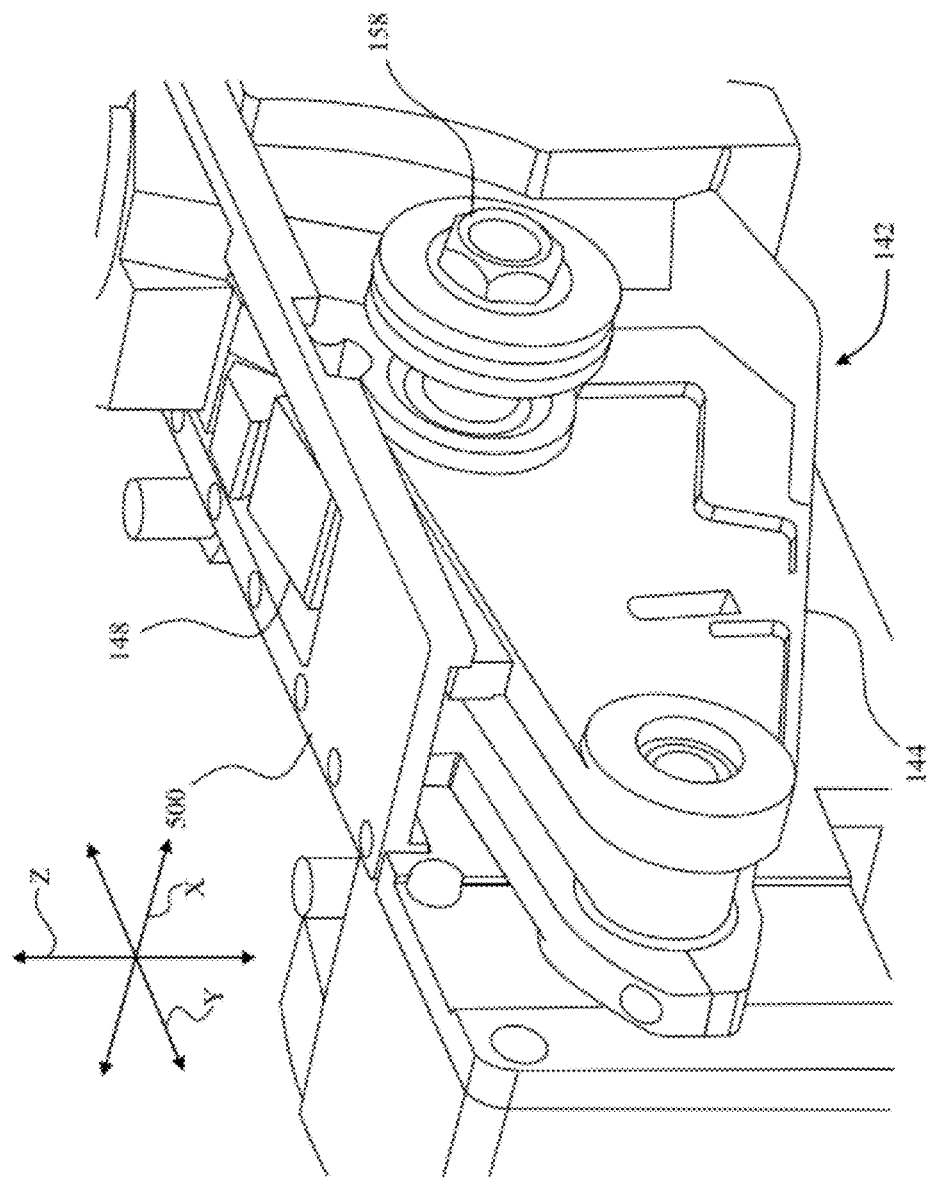

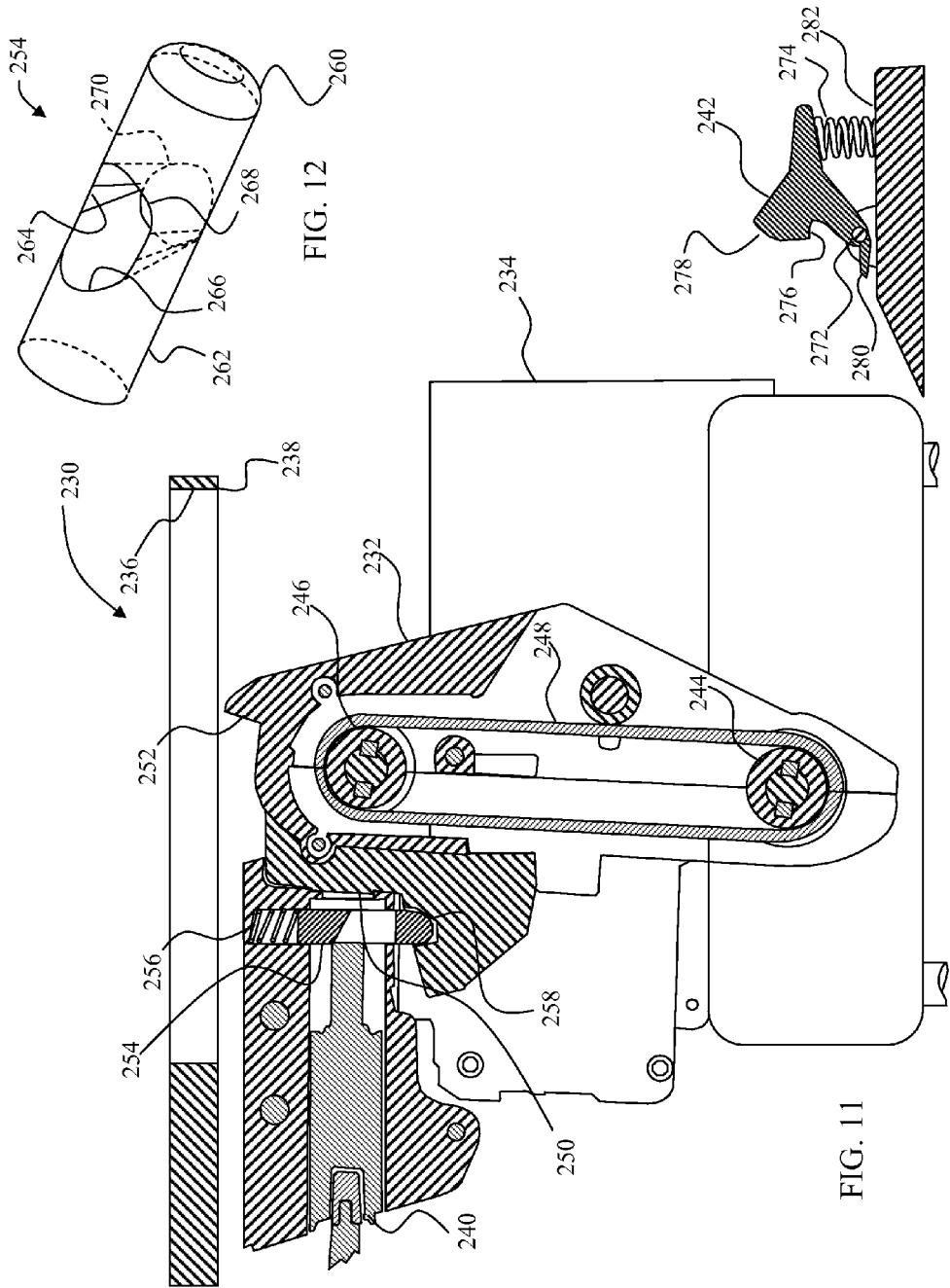

TABLE SAW WITH ALIGNMENT PLATE

Cross-reference is made to U.S. Utility patent application Ser. No. 12/547,818 entitled "Table Saw with Actuator Module" by Mehta et al., which was filed on Aug. 26, 2009; U.S. Utility patent application Ser. No. 12/547,859 entitled "Table Saw with Dust Shield" by Chung, which was filed on Aug. 26, 2009; U.S. Utility patent application Ser. No. 12/547,912 entitled "Table Saw with Positive Locking Mechanism" by Chung et al., which was filed on Aug. 26, 2009; U.S. Utility patent application Ser. No. 12/547,977 entitled "Table Saw with Belt Stop" by Chung, which was filed on Aug. 26, 2009; U.S. Utility patent application Ser. No. 12/548,156 entitled "Table Saw with Swing Arm Support" by Chung et al., which was filed on Aug. 26, 2009; U.S. Utility patent application Ser. No. 12/548,201 entitled "Table Saw with Mechanical Fuse" by Oberheim, which was filed on Aug. 26, 2009; U.S. Utility patent application Ser. No. 12/548,236 entitled "Table Saw with Pressure Operated Actuator" by Fischer et al., which was filed on Aug. 26, 2009; U.S. Utility patent application Ser. No. 12/548,263 entitled "Table Saw with Reset Mechanism" by Groth et al., which was filed on Aug. 26, 2009; U.S. Utility patent application Ser. No. 12/548,280 entitled "Table Saw with Linkage Drop System" by Holmes et al., which was filed on Aug. 26, 2009; U.S. Utility patent application Ser. No. 12/548,317 entitled "Table Saw with Ratchet Mechanism" by Chung et al., which was filed on Aug. 26, 2009; and U.S. Utility patent application Ser. No. 12/548,342 entitled "Table Saw with Actuator Reset Mechanism" by Chung, which was filed on Aug. 26, 2009, the entirety of each of which is incorporated herein by reference. The principles of the present invention may be combined with features disclosed in those patent applications.

FIELD

The present disclosure relates to power tools and more particularly to power tools with exposed shaping devices.

BACKGROUND

A number of power tools have been produced to facilitate forming a work piece into a desired shape. One such power tool is a table saw. A wide range of table saws are available for a variety of uses. Some table saws such as cabinet table saws are very heavy and relatively immobile. Other table saws, sometimes referred to as jobsite table saws, are relatively light. Jobsite table saws are thus portable so that a worker can position the table saw at a job site. Some accuracy is typically sacrificed in making a table saw sufficiently light to be mobile. The convenience of locating a table saw at a job site, however, makes job site table saws very desirable in applications such as general construction projects.

All table saws, including cabinet table saws and job site table saws, present a safety concern because the saw blade of the table saw is typically very sharp and moving at a high rate of speed. Accordingly, severe injury such as severed digits and deep lacerations can occur almost instantaneously. A number of different safety systems have been developed for table saws in response to the dangers inherent in an exposed blade moving at high speed. One such safety system is a blade guard. Blade guards movably enclose the saw blade, thereby providing a physical barrier that must be moved before the rotating blade is exposed. While blade guards are effective to prevent some injuries, the blade guards can be removed by a user either for convenience of using the table saw or because the blade guard is not compatible for use with a particular shaping device. By way of example, a blade guard is typically not compatible with a dado blade and must typically be removed when performing non-through cuts.

Table saw safety systems have also been developed which are intended to stop the blade when a user's hand approaches or touches the blade. Various stopping devices have been developed including braking devices which are physically inserted into the teeth of the blade. Such approaches are extremely effective. Upon actuation of this type of braking device, however, the blade is typically ruined because of the braking member. Additionally, the braking member is typically destroyed. Accordingly, each time the safety device is actuated; significant resources must be expended to replace the blade and the braking member. Another shortcoming of this type of safety device is that the shaping device must be toothed. Moreover, if a spare blade and braking member are not on hand, a user must travel to a store to obtain replacements. Thus, while effective, this type of safety system can be expensive and inconvenient.

Some safety systems incorporating blade braking systems also move the blade below the surface of the table saw once the blade has been stopped. In this type of system, a latch is typically used to maintain the blade in position above the table saw surface until the braking system is activated.

Once a safety system has been activated and the unsafe condition cleared, the table saw may be returned to operation. Because the blade has been moved, the blade must be realigned before further work piece shaping can occur. Realignment of the blade may be more difficult as a result of the force used to move the blade at the speed desired to reduce injuries. The large amount of force may result in some changes in the relative positions of components which, while acceptable for operation of the table saw, provide reduced accuracy in the alignment of the blade with respect to the work support surface.

While table saws are typically provided with components which allow accurate alignment of the blade with respect to the work piece support surface, reference devices needed to function as a guide for the realignment process may not be readily available. Moreover, alignment of the blade can require a substantial delay in returning the table saw to service.

In view of the foregoing, it would be advantageous to provide a power tool with a safety system that did not damage the blade or other shaping device when the safety system is activated. A further advantage would be realized by a safety system that could be repeatedly activated without the need for realignment of the blade or other shaping device with respect to a work piece support surface.

SUMMARY

In accordance with one embodiment, table saw includes a latch hold mechanism, a swing arm pivotable about a pivot along a swing arm path between a first swing arm position and a second swing arm position, at least one alignment plate positioned adjacent to a portion of the swing arm when the swing arm is in the first position, a latch pin movable between a first latch pin position whereat the swing arm is biased against the at least one alignment plate and a second latch pin position whereat the swing arm is not biased by the latch pin, an actuating device configured to transfer a force to the swing arm when the swing arm is at the first swing arm position resulting in a bias on the latch pin in a direction toward the second latch pin position, and a control system configured to control the actuating device to transfer a force to the swing arm when the swing arm is maintained at the first swing arm position sufficient to move the latch pin from the first latch pin position to the second latch pin position.

In another embodiment, a power tool includes a latch hold mechanism, an alignment member, a swing arm movable along a swing arm path between a first swing arm position in contact with the alignment member and a second swing arm position spaced apart from the alignment member, a latch pin movable between a first latch pin position whereat the swing arm is maintained at the first swing arm position and a second latch pin position whereat the swing arm is not maintained at the first swing arm position, an actuating device configured to transfer a first force to the latch pin to bias the latch pin in a direction toward the second latch pin position, and, after transferring the first force, further configured to transfer a second force to the swing arm, and a control system configured to control the actuating device.

BRIEF DESCRIPTION OF THE DRAWINGS

The accompanying drawings illustrate various embodiments of the present disclosure and together with a description serve to explain the principles of the disclosure.

FIG. 4C depicts a perspective view of the swing arm assembly and alignment member of FIG. 3 in a latched position;

FIG. 11 depicts a partial perspective cross-sectional view of a power tool with a vertical swing arm and a positive locking mechanism;

FIG. 12 depicts a perspective view of the positive locking mechanism of FIG. 11;

Corresponding reference characters indicate corresponding parts throughout the several views. Like reference characters indicate like parts throughout the several views.

DETAIL DESCRIPTION OF THE DISCLOSURE

Figure 1:
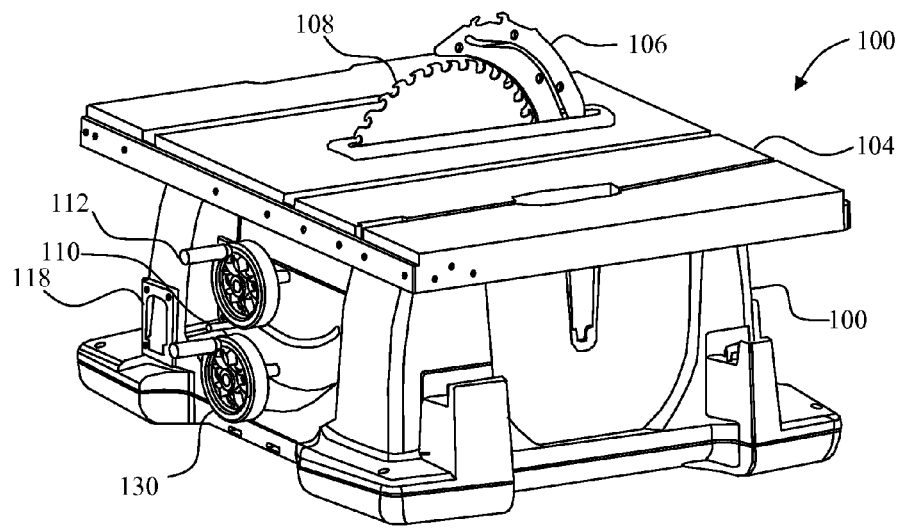
FIG. 1 depicts a top perspective view of a table saw incorporating a mitigation system in accordance with principles of the invention.

While the power tools described herein are susceptible to various modifications and alternative forms, specific embodiments thereof have been shown by way of example in the drawings and will herein be described in detail. It should be understood, however, that there is no intent to limit the power tools to the particular forms disclosed. On the contrary, the intention is to cover all combinations of features, modifications, equivalents, and alternatives falling within the spirit and scope of the invention as defined by the appended claims.

Referring to FIG. 1, a table saw 100 is shown. The table saw 100 includes a base housing 102 and a work-piece support surface 104. A splitter 106 is positioned adjacent to a blade 108 which extends from within the base housing 102 to above the work-piece support surface 104. A blade guard (not shown) may be attached to the splitter 106. An angle indicator 110 indicates the angle of the blade 108 with respect to the work-piece support surface 104. A bevel adjust turn-wheel 112 may be used to establish the angle of the blade 108 with respect to the work-piece support surface 104 by pivoting a frame 114 (shown in FIG. 2) within the base housing 102.

A motor 116 which is powered through a switch 118 located on the base housing 102, is supported by a carriage assembly 120. The carriage assembly 120 and a stop pad 122 are supported by the frame 114. The carriage assembly 120 includes a carriage 124 to which the motor 116 is mounted and two guiderails 126/128. The position of the carriage 124 along the guiderails 126/128 is controlled by a blade height turn-wheel 130 through a gearing assembly 132 and a height adjustment rod 134. The carriage 124 fixedly supports a latch assembly 140 and supports a swing arm assembly 142.

Figure 3:
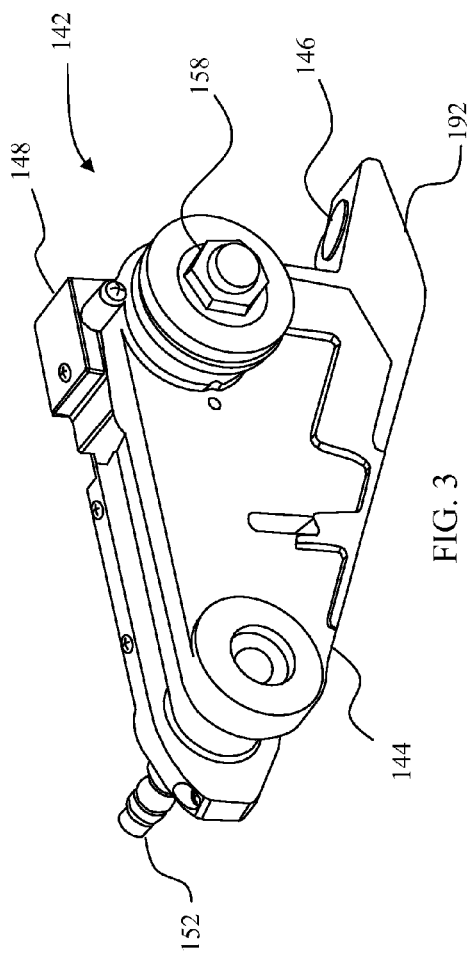
FIG. 3 depicts a perspective view of the swing arm assembly of the table saw of FIG. 1.
Figure 4A:
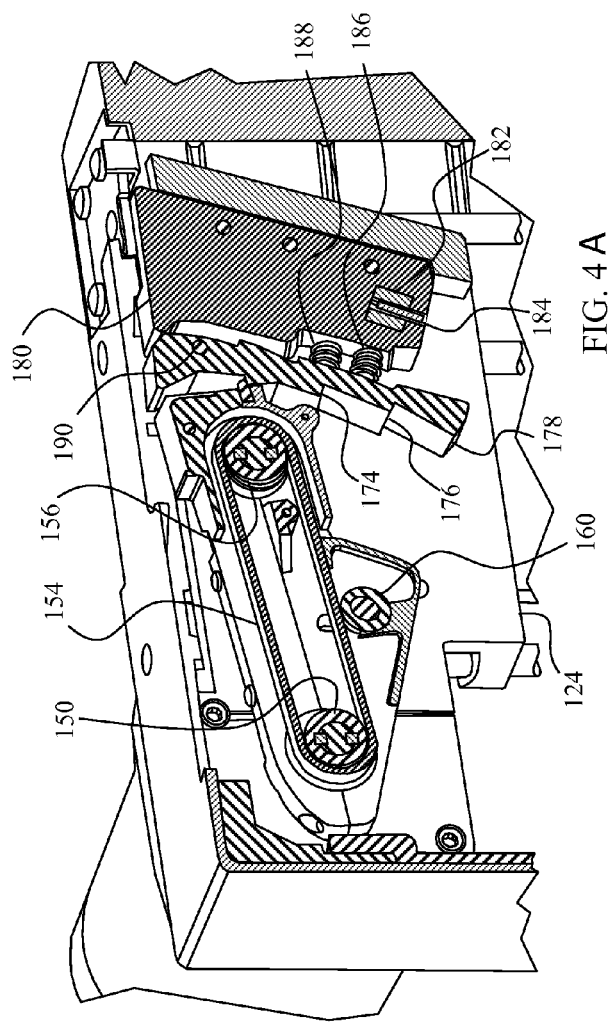
FIG. 4A depicts a partial perspective cross-sectional view of the swing arm assembly of FIG. 3 supported by a latch assembly including a latch hold that is biased against the swing arm assembly.
Figure 7:
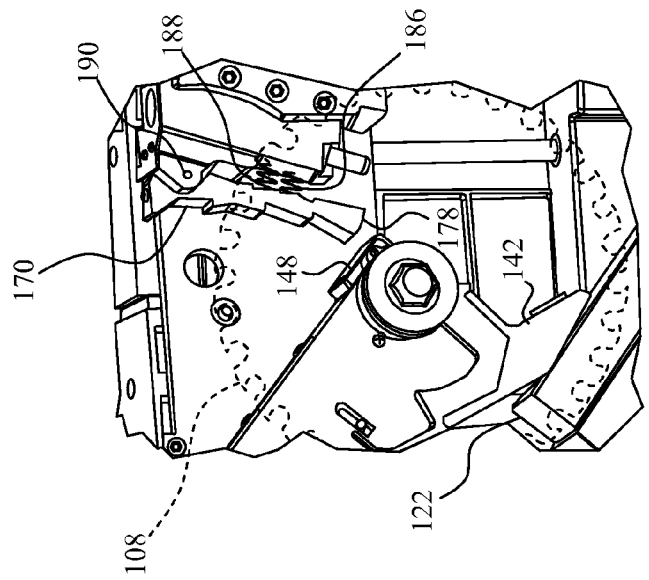
FIG. 7 depicts a partial perspective view of the swing arm assembly and latch assembly of FIG. 1 after the swing arm assembly has cleared the latch hold allowing the latch hold to be biased into the swing path.

The swing arm assembly 142 is pivotally coupled to the carriage 124 for movement between a latched position (see FIG. 4A) and a de-latched position (see FIG. 7). The swing arm assembly 142 includes a housing 144, which encloses a power wheel 150 that is driven by a power shaft 152, as shown in FIGS. 3 and 4A. The power shaft 152 may be directly driven by the motor 116 or by a reduction gear. A belt 154 transfers rotational movement from the power wheel 150 to a blade wheel 156. A nut 158 is used to affix the blade 108 (not shown in FIGS. 3 and 4A for purpose of clarity) to the blade wheel 156. A tensioner 160 maintains the belt 154 at a desired tension. Additionally, as shown in FIG. 3, the swing arm assembly 142 may also include a strike plate 146 and a rebound plate 148 mounted on the housing 144.

Figure 4B:
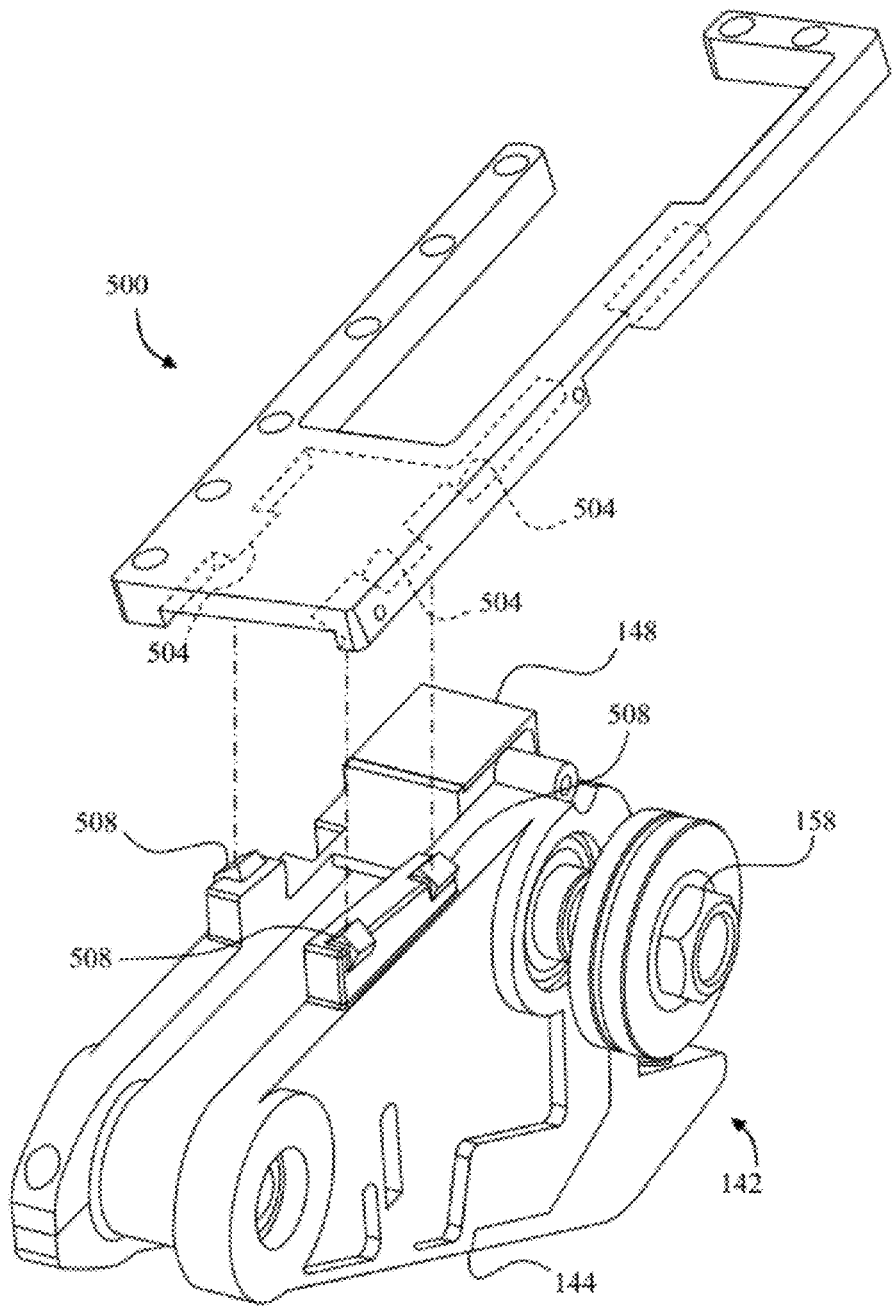
FIG. 4B depicts a partially exploded perspective view of a swing arm assembly configured to engage an alignment member.
Figure 4D:
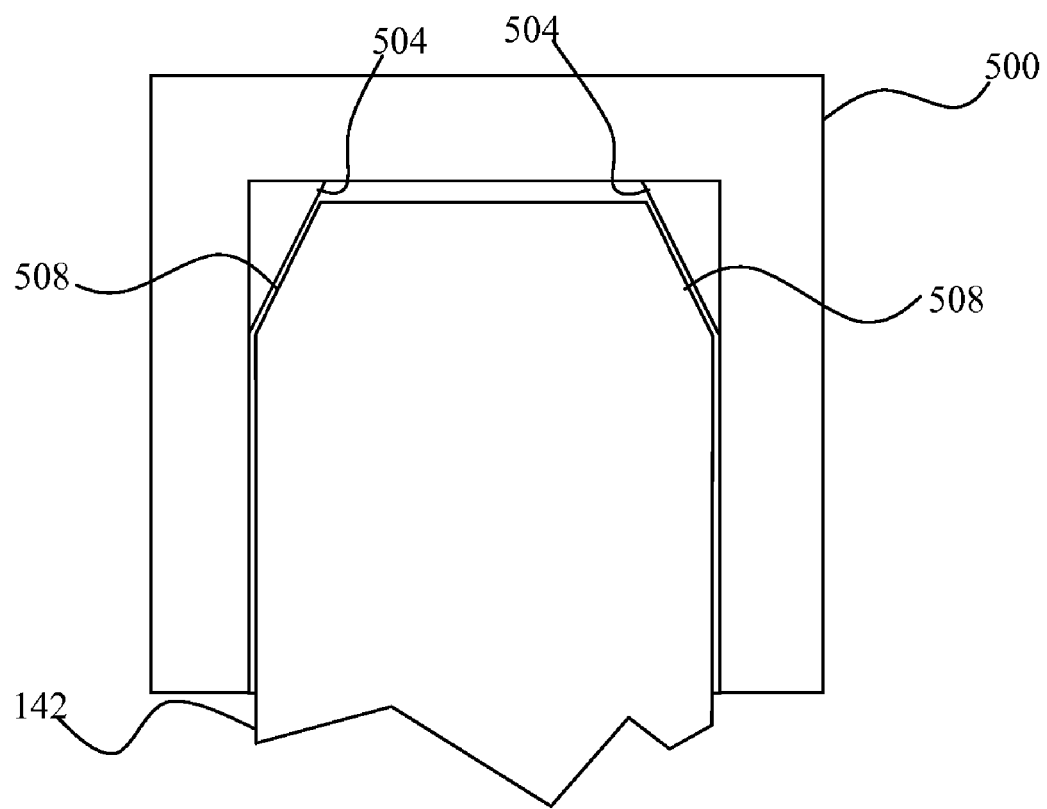
FIG. 4D depicts a partial cross-sectional view of a swing arm assembly and an alignment member.

As shown in FIGS. 4B, 4C, and 4D, the table saw 100 includes an alignment member 500 configured to engage the swing arm assembly 142 when the swing arm assembly 142 is in the latched position. The alignment member 500 may be fixedly attached to the carriage 124 in a plurality of orientations with respect to the work piece support surface 104 using adjustment devices (not shown) as are known in the art. The alignment member 500 aligns the swing arm assembly 142 in the same position each time the swing arm assembly 142 enters the latched position. To this end, the illustrated alignment member 500 includes three alignment plates 504 positioned in opposition to three alignment plates 508 of the swing arm assembly 142. As illustrated most clearly in FIG. 4D, the alignment plates 504 and the alignment plates 508 are protrusions positioned in opposition to one another. In response to the swing arm assembly 142 entering the latched position, the alignment plates 508 of the swing arm assembly 142 become seated against the alignment plates 504 of the alignment member 500 to position precisely the swing arm assembly 142 relative to the frame 114 by contact between six surfaces.

Figure 5:
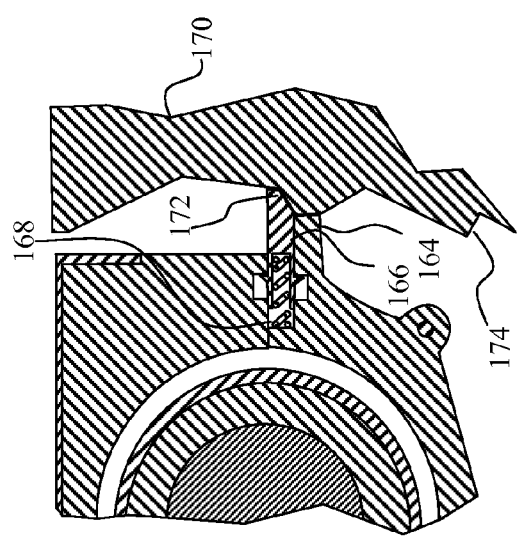
FIG. 5 depicts a partial cross-section view of a swing arm assembly held in position by a latch pin biased against a latch hold.

With reference to FIG. 5, the swing arm assembly 142 also includes a lip 164 and a latch pin 166 which is biased by a spring 168 toward a latch hold 170 which is part of the latch assembly 140. The latch pin 166 is movable between a first latch pin 166 position in which the latch pin 166 biases the swing arm assembly 142 against the alignment member 500 and a second latch pin 166 position in which the latch pin 166 does not bias the swing arm assembly 142 against the alignment member 500. The latch hold 170 includes a latch ledge 172 and three rebound ledges 174, 176, and 178 (see FIG. 4A). As shown in FIG. 4A, the latch ledge is formed complementarily to the shape of the latch pin 166. The latch assembly 140 further includes a base 180 and a solenoid 182 with a solenoid pin 184. Two springs 186 and 188 are positioned between the base 180 and the latch hold 170 which is mounted by a pivot 190 to the carriage 124.

Operation of the table saw 100 is described with reference to FIGS. 1-5. Initially, the swing arm assembly 142 is maintained in a latched position with the latch pin 166 resting on the latch ledge 170 as shown in FIG. 5. In this position, the springs 188 and 186 are under compression and exert a bias on the latch hold 170 about the pivot 190 in a clockwise direction as viewed in FIG. 4A. The latch hold 170 is thus biased into contact with the lip 164 of the swing arm assembly 142 which restricts rotation of the latch hold 170.

Additionally, the blade wheel 156 is positioned sufficiently close to the work-piece support surface 104 that the blade 108 extends above the work-piece support surface 104 as shown in FIG. 1. A user operates the bevel adjust turn wheel 112 to pivot the frame 114 with respect to the work-piece support surface 104 to establish a desired angle between the blade 108 and the work-piece support surface 104. The user further operates the blade height adjustment turn-wheel 130 to move the carriage 124 along the guiderails 126/128 to establish a desired height of the blade 108 above the work-piece support surface 104.

Using the switch 118, power is then applied to the motor 116 causing the output shaft 152 and the power wheel 150 to rotate. Rotation of the power wheel 150 causes the belt 154 to rotate the blade wheel 156 and the blade 108 which is mounted on the blade wheel 156. A work-piece may then be shaped by moving the work-piece into contact with the blade 108.

The table saw 100 includes a sensing and control circuit (not shown) which activates the solenoid 182 in response to a sensed condition. Any desired sensing and control circuit may be used for this purpose. One acceptable sensing and control circuit is described in U.S. Pat. No. 6,922,153, the entire contents of which are herein incorporated by reference. The safety detection and protection system described in the '153 patent senses an unsafe condition and provides a control signal which, in the table saw 100, is used to actuate the solenoid 182.

Upon actuation of the solenoid 182, the solenoid pin 184 is forced outwardly from the solenoid 182. When the swing arm assembly 142 is maintained in a latched position with the latch pin 166 resting on the latch ledge 170 as shown in FIG. 5, the strike plate 146 is aligned with the solenoid 182. Accordingly, as the solenoid pin 184 is forced out of the solenoid 182, the solenoid pin 184 impacts the strike plate 146.

The shape of the latch pin 166 and the latch ledge 172 is selected such that the impact of the solenoid pin 184 on the strike plate 146 generates a force tending to push the latch pin 166 against the spring 168. The spring constant of the spring 168 and the operating characteristics of the solenoid 182 are selected such that when the solenoid pin 184 impacts the strike plate 146 the generated force is sufficient to compress the spring 168 and to force the latch pin 166 into a position whereat the swing arm assembly 142 is no longer maintained in position adjacent to the latch assembly 140 by the latch pin 166. In embodiments with a rigid latch pin 166, the generated force causes the latch hold 170 to rotate about the pivot 190 in a counterclockwise direction thereby forcing the springs 186 and 188 into further compression. When the latch hold 170 has rotated sufficiently, the latch ledge moves out from underneath the latch pin 166.

In either event, the swing arm assembly 142 is no longer supported by the latch hold 170. Consequently, the swing arm assembly 142 pivots about the power shaft 152 in the direction of the arrow 200 of FIG. 6 such that the blade wheel 156 moves away from the work-piece support surface 104 through the position shown in FIG. 6 to the position shown in FIG. 7. Accordingly, the blade 108 is pulled by the swing arm assembly 142 in a direction away from the work-piece support surface 104.

Because the latch ledge 172 is formed complementarily to the shape of the latch pin 166, the wear of the latch ledge 172 and the latch pin 166 during the de-latching described above is reduced. Accordingly, the pressure needed to effect de-latching does not change significantly over multiple actuations of the solenoid 182.

As the swing arm assembly 142 moves in the direction of the arrow 200, the rebound plate 148 of the swing arm assembly 142 rotates below the rebound ledge 178 of the latch hold 170. At this point, rotation of the latch hold 170 about the pivot 190 is no longer restrained by the swing arm assembly 142. Accordingly, the springs 186 and 188 cause the latch hold 170 to rotate into a position whereat the rebound ledge 178 is located in the swing path of the swing arm 142, that is, the path along which the swing arm 142 moves, as shown in FIG. 7.

Figure 6:
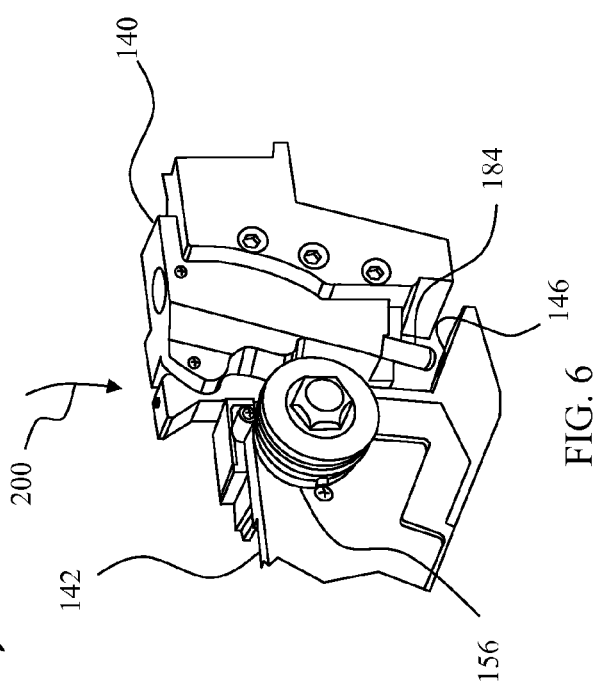
FIG. 6 depicts a partial perspective view of the swing arm assembly and latch assembly of FIG. 1 after the solenoid has been actuated thereby forcing the latch pin off of the latch hold such that the swing arm assembly moves away from the latch assembly.

The configuration of FIG. 7 further shows the swing arm assembly 142 rotated to a position whereat the swing arm assembly 142 contacts the stop pad 122. Accordingly, further rotation of the swing arm assembly 142 in the direction of the arrow 200 of FIG. 6 is impeded by the stop pad 122. At this position, the blade 108 is completely located below the work-piece support surface 104. Therefore, an operator above the work-piece support surface 104 cannot be injured by the blade 108.

In one embodiment, the stop pad 122 is made with microcellular polyurethane elastomer (MPE). MPEs form a material with numerous randomly oriented air chambers. Some of the air chambers are closed and some are linked. Additionally, the linked air chambers have varying degrees of communication between the chambers and the orientation of the linked chambers varies. Accordingly, when the MPE structure is compressed, air in the chambers is compressed. As the air is compressed, some of the air remains within various chambers, some of the air migrates between other chambers and some of the air is expelled from the structure. One such MPE is MH 24-65, commercially available from Elastogran GmbH under the trade name CELLAST®. In other embodiments, a foam material such as "memory foam" may be used.

Use of an MPE or other appropriate material in the stop pad 122 stops rotation of the swing arm assembly 142 without damaging the swing arm assembly 142. Prior to impacting the stop pad 122, however, the swing arm assembly 142 may be moving with sufficient force to cause the swing arm assembly to rebound off of the stop pad 122. In such a circumstance, the swing arm assembly 142 will rotate about the power shaft 152 in a counterclockwise direction. Thus, the blade 108 moves toward the work-piece support surface 104. Movement of the blade 108 above the work-piece support surface 104, however, is inhibited by the latch hold 170.

Figure 8:
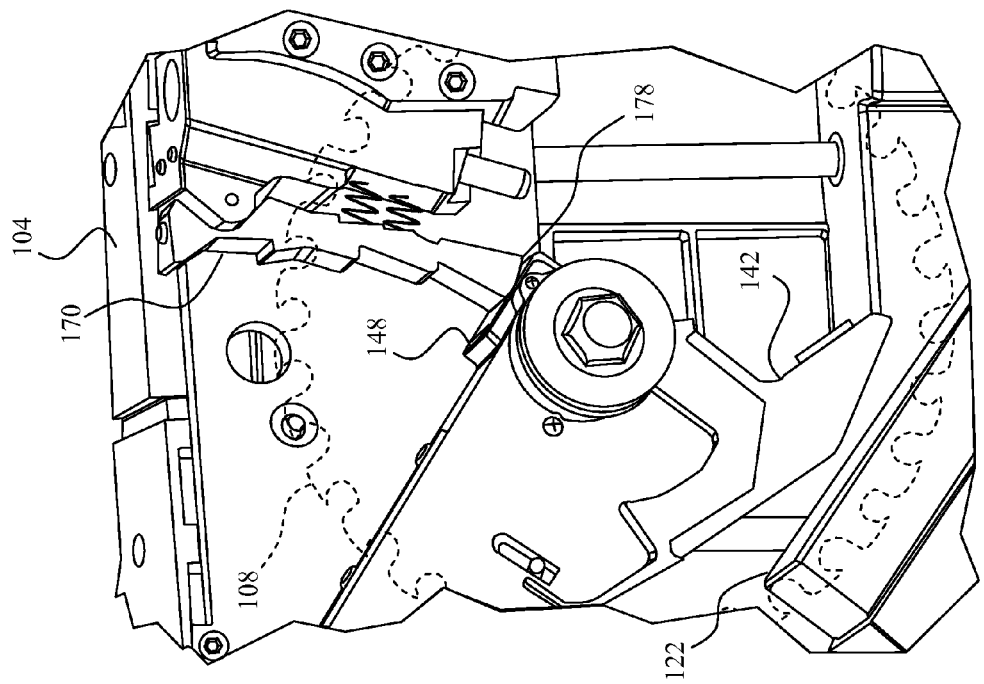
FIG. 8 depicts a partial perspective view of the swing arm assembly and latch assembly of FIG. 1 after the swing arm assembly has rebounded off of the stop pad and has been captured by a latch hold ledge thereby keeping the shaping device below the surface of the work-piece support surface.

Specifically, because the springs 186 and 188 bias the latch hold 170 to a location within the swing path of the swing arm assembly 142, movement of the swing arm assembly 142 toward the work-piece support surface 104 brings the rebound plate 148 into contact with the rebound ledge 178 as shown in FIG. 8. In the position of FIG. 8, the blade 108 remains below the surface of the work-piece support surface 104 even after the swing arm assembly 142 rebounds off of the stop pad 122. Therefore, an operator above the work-piece support surface 104 cannot be injured by the blade 108.

The spring constants for the springs 186 and 188 are thus selected to ensure that the latch hold 170 is positioned within the swing path of the swing arm assembly 142 before the swing arm assembly 142 travels from the latched position downwardly into contact with the stop pad 122 and then upwardly to a position whereat the blade 108 is above the work-piece support surface 104. Of course, the time available for moving the latch hold 170 into the swing path can be increased by moving the stop pad 122 further away from the work-piece support surface 104 along the swing path. Such modification increases the overall height of the frame 114, particularly for embodiments with variable blade height. The increased material for the frame 114 results in increased weight. Increased size and weight are generally not desired for movable power tools. Thus, positioning the stop pad 122 closer to the work-piece support surface 104 along the swing path reduces the height of the frame 114 and the resultant weight of the table saw 100.

Figure 9:
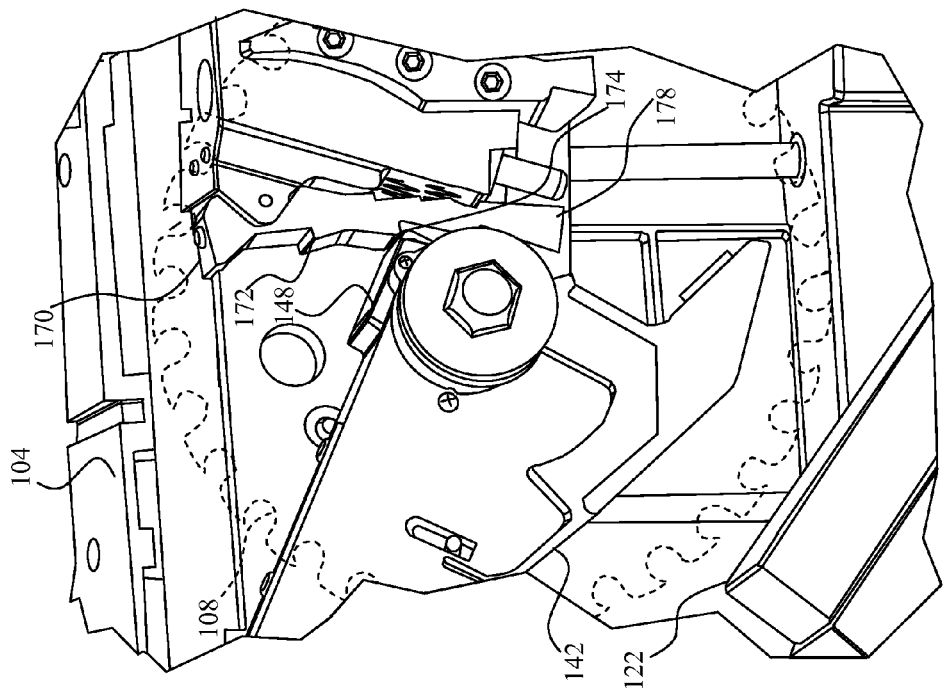
FIG. 9 depicts a partial perspective view of the swing arm assembly and latch assembly of FIG. 1 after the swing arm assembly has rebounded off of the stop pad and has been captured by a secondary latch hold ledge thereby keeping the shaping device below the surface of the work-piece support surface.

For some embodiments wherein the stop pad 122 is positioned closer to the work-piece support surface 104 along the swing path, such as the embodiment of FIG. 1, the distance between the swing arm assembly 142 in the latched position and the stop pad 122 is such that the swing arm assembly 142 contacts the stop pad 122 before the rebound plate 148 rotates beneath the rebound ledge 178. Accordingly, the rebound ledges 174 and 176 are provided at locations above the rebound ledge 178 to contact the rebound plate 148 when the swing arm assembly 142 is actuated with the carriage 124 positioned closer to the stop pad 122 as depicted in FIG. 9. In other embodiments, rebound ledges 174 and 176 may be provided as safety measures in the event the latch hold 170 does not move with the designed speed.

Figure 2:
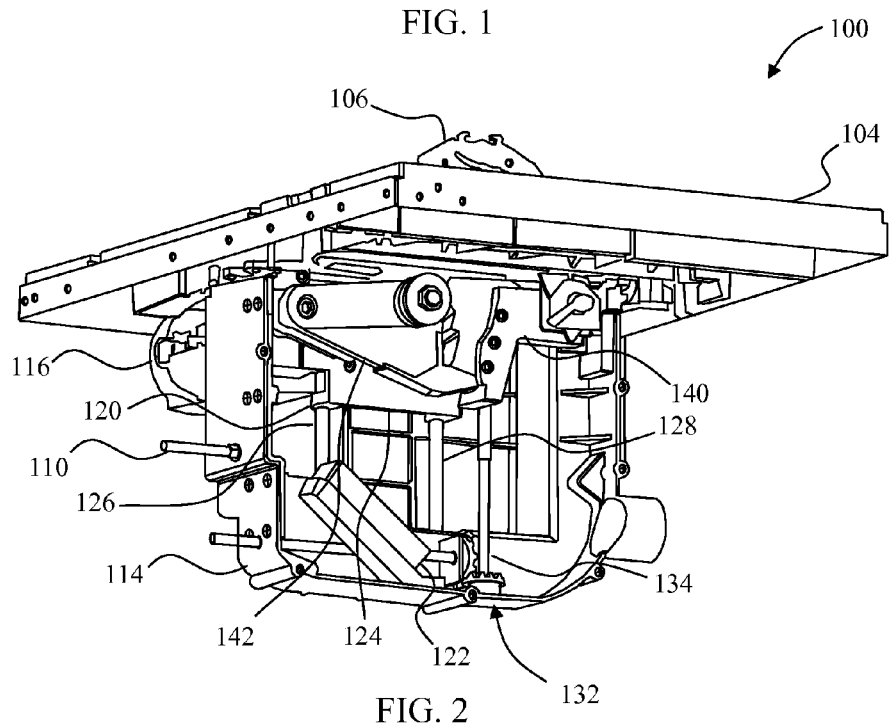
FIG. 2 depicts a bottom perspective view of the table saw of FIG. 1 with the housing removed showing a movable carriage mounted on a pivoting frame beneath the work-piece support surface.

The angle and length of the stop pad 122 are selected in the embodiment of FIG. 2 to ensure that the swing arm assembly 142 contacts the stop pad 122 at the foot 192 (see FIG. 3) regardless of the initial height of the carriage 124. Thus the foot 192 receives the force of the impact when the swing arm assembly 142 contacts the stop pad 122. Accordingly, while the materials used to form the foot 192, the strike plate 146, and the rebound plate 148 are selected to absorb multiple impacts, lighter materials may be used in other areas of the swing arm assembly 142 to minimize weight of the table saw 100.

Once the sensed condition has been cleared, the swing arm assembly 142 is reset by moving the latch hold 170 out of the swing path. This is effected by compressing the springs 188 and 186. The swing arm assembly 142 may then be rotated in a counterclockwise direction about the output shaft 152 until the rebound plate 148 is adjacent to the upper surface of the latch hold 170 and the alignment plates 508 of the swing arm assembly 142 become seated against the alignment plates 504 of the alignment member 500. The latch hold 170 is then released and the springs 188 and 186 bias the latch hold 170 about the pivot 190 into contact with the lip 164 of the swing arm assembly 142 which restricts rotation of the latch hold 170. Additionally, the swing arm assembly 142 is maintained in a latched position with the latch pin 166 resting on the latch ledge 170 as shown in FIG. 5. A biasing force acting upon the latch pin 166 forces the swing arm assembly 142 into contact with alignment member 500, as described below.

When the swing arm assembly 142 contacts the alignment member 500 engagement of the alignment plates 504 with the alignment plates 508 causes the swing arm assembly 142 to become aligned precisely with frame 114. For instance, a three dimensional Cartesian coordinate system may be defined as illustrated in FIG. 4C. The z-axis defines a vertical direction. The x-axis defines a direction perpendicular to the pivotal motion of the swing arm assembly 142. The y-axis is perpendicular to the x-axis and the z-axis. The alignment member 500 is configured to align the swing arm assembly 142 about the z-axis using three points of contact.

In particular, the alignment member 500 limits the rotation of the swing arm assembly 142 at precisely the same point about the z-axis each time the swing arm assembly 142 enters the latched position because the swing arm assembly 142 is pinched between a first surface of two alignment plates 504 on one side of the swing arm assembly 142 and a first surface of a third alignment plates 504 on the other side of the swing arm assembly 142. To facilitate seating of the alignment plates 508 and the alignment plates 504, one or more of the alignment plates 508 and/or the alignment plates 504 may be angled with respect to a plane defined by the z-axis and the x-axis. Accordingly, the blade 108 which is coupled to the swing arm assembly 142 is also precisely positioned to enable the table saw 100 to be aligned for use easily and quickly after the sensed condition has been cleared.

The table saw 100 thus actively monitors for an unsafe condition and initiates mitigation action automatically in the event an unsafe condition is sensed. Additionally, movement and subsequent stopping of the swing arm assembly 172 is accomplished without requiring physical contact with the blade 108. Accordingly, the blade 108 is not damaged by the mitigation action.

Moreover, because the mitigation action does not require interaction with the blade 108, the mitigation system of the table saw 100 may be used with other shaping devices such as sanding wheels, blades with varying dado blades, and molding head cutters, without requiring any modification to the mitigation system. Additionally, because the moving components of the mitigation system can be mounted on the frame 114, the mitigation system can be used with any desired blade height or bevel angle.

The mitigation system discussed with respect to the table saw 100 can be implemented using very light materials, and is thus amenable to incorporation into a variety of power tools including bench top saws and portable saws. For example, the components which are subjected to increased stress within the mitigation system, such as the solenoid pin 184, the latch hold 170, the rebound plate 148, and the strike plate 146, can be made of more durable materials including metals to withstand the impacts and stresses of activating the mitigation system. Other components, including the housings, may be fabricated from more lightweight materials to minimize the weight of the power tool.

Figure 10:
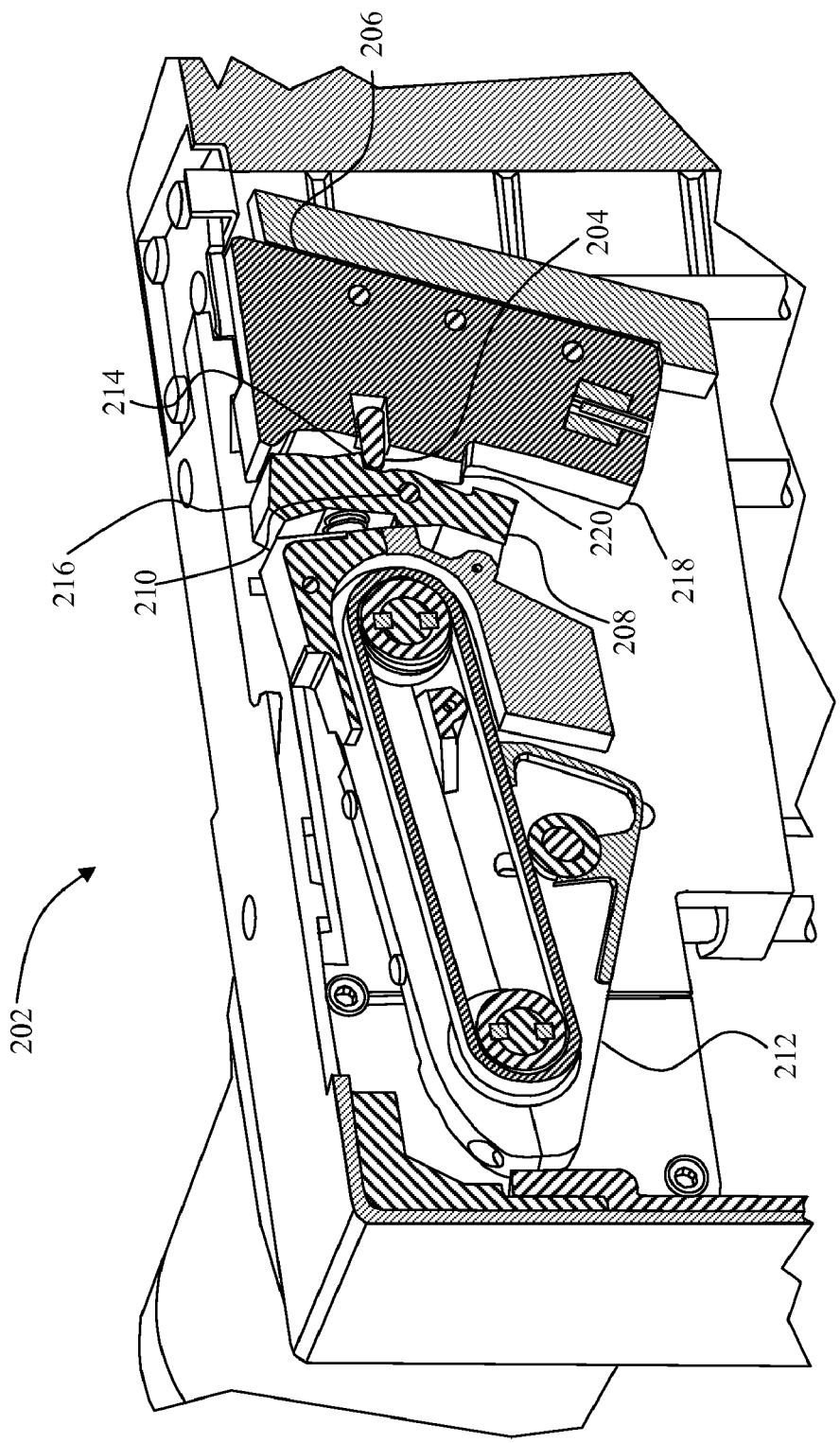
FIG. 10 depicts a partial perspective cross-sectional view of a power tool with a latching pin that does not rotate with the swing arm mechanism.

If desired, the components of the table saw 100 may repositioned within the housing 102. By way of example, FIG. 10 depicts a power tool 202 with a latch pin 204 positioned within a base 206. The latch pin 204 is biased by a spring (not shown) toward a latch hold 208 which is pivotably mounted by a pivot 210 to a swing arm assembly 212. In this embodiment, the latch hold 208 includes a latch ledge 214 and a single rebound ledge 216. The base 206 includes a rebound plate 218. An additional rebound plate 220 is provided on the base 206 as a safety measure in the event the latch hold 208 does not move with the designed speed in a manner similar to the latch hold 170. Operation of the power tool 202 as configured in the manner of FIG. 10 is substantially identical to operation of the table saw 100 as configured in FIG. 4A.

A further example of rearranged components is shown in FIG. 11, wherein a power tool 230 includes a swing arm assembly 232 mounted vertically on a carriage assembly 234 below a slot 236 in a work support surface 238. The power tool 230 further includes a solenoid 240 and a rebound latch 242, both of which are also mounted to the carriage assembly 234. The swing arm assembly 232 includes a power wheel 244 which rotates a blade wheel 246 through a belt 248. The swing arm assembly 232 further includes a strike plate 250 and a latch plate 252.

The swing arm assembly 232 is maintained in the position shown in FIG. 11 by a latch pin 254. The latch pin 254 is biased by a spring 256 into a latch recess 258 in the swing arm assembly 232. The pin 254, also shown in FIG. 12, includes a head 260 and a body 262. A bore 264 extends through the body 262 and includes an actuation ramp 266. The surface of the actuation ramp 266 is angled from an upper portion 268 of the bore 264 to a lower portion 270 of the bore 264.

The rebound latch 242 is pivotably mounted to the carriage assembly 234 by a pivot 272. A spring 274 biases the rebound latch 242 in a counter clockwise direction as viewed in FIG. 11. The rebound latch 242 includes a rebound ledge 276, a release 278, and a latch foot 280. A stop pad 282 is also mounted to the carriage assembly 234.

Figure 13:
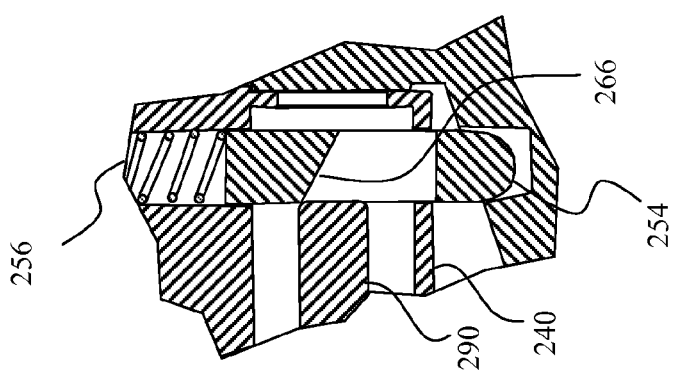
FIG. 13 depicts a partial cross-sectional view of the positive locking mechanism of FIG. 11 as a solenoid pin contacts an actuation ramp in a bore extending through the positive locking mechanism.

Operation of the power tool 230 may be substantially identical to operation of the table saw 100 through the firing of the solenoid 240. When the solenoid 240 is actuated, however, a solenoid pin 290, shown in FIG. 13, is forced outwardly from the solenoid 240 into contact with the actuation ramp 266. The shape of the solenoid pin 290 and the actuation ramp 266 forces the latch pin 254 against the spring 256. The force transferred from the solenoid 240 is sufficient to overcome the bias of the spring 256. Accordingly, the spring 256 is compressed and the pin 254 moves outwardly from the latch recess 258 to the position shown in FIG. 14.

Figure 14:
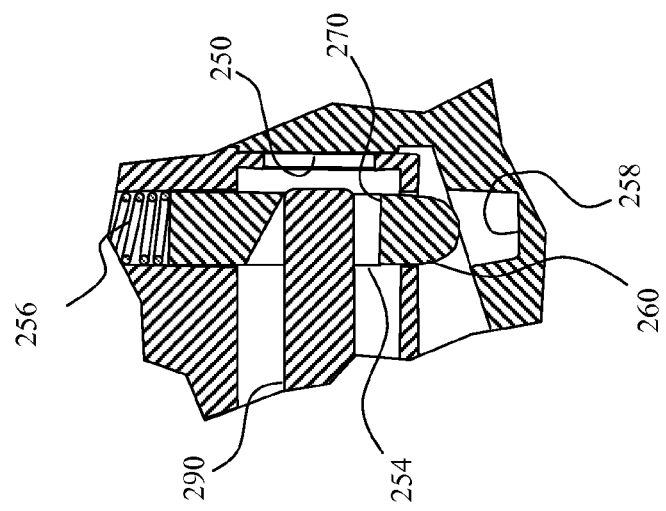
FIG. 14 depicts a partial cross-sectional view of the positive locking mechanism of FIG. 11 as a strike plate is exposed to the solenoid pin of FIG. 13 through the bore in the positive locking mechanism.

In FIG. 14, the latch pin 254 has moved to a position whereat the strike plate 250 of the swing arm assembly 232 is exposed to the solenoid pin 290 through the lower portion 270 of the bore 264. Additionally, the head 260 of the latch pin 254 has been moved to a position whereat rotation of the swing arm assembly 232 is not inhibited by the latch pin 254, even though a portion of the latch pin 254 may remain within the recess 258.

Figure 15:
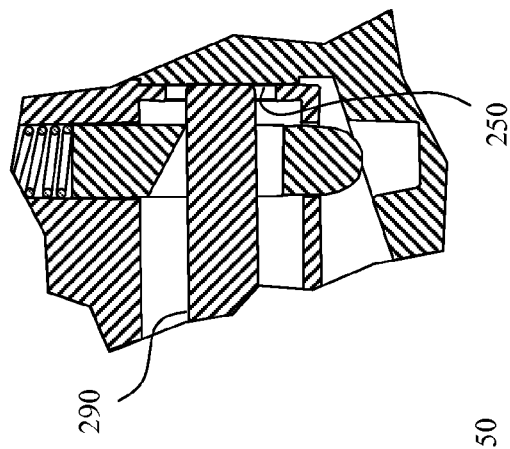
FIG. 15 depicts a partial cross-sectional view of the positive locking mechanism of FIG. 11 as the solenoid pin of FIG. 13 impacts the strike plate.
Figure 16:
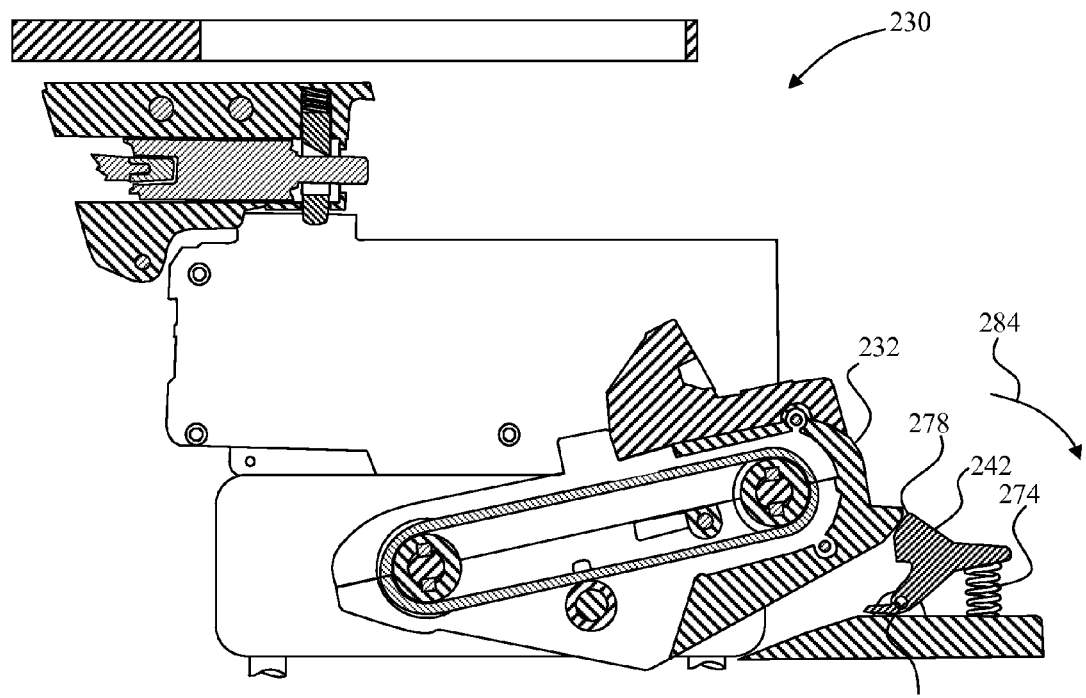
FIG. 16 depicts a partial cross-sectional view of the power tool of FIG. 11 as the swing arm assembly contacts a release on a rebound latch.

Continued movement of the solenoid pin 290 outwardly from the solenoid 240 causes the solenoid pin 290 to contact the strike plate 250 as depicted in FIG. 15. The solenoid pin 290 transfers sufficient force to the strike plate 250 to cause the swing arm assembly 232 to rotate about the power wheel 244 in a manner similar to the rotation of the swing arm assembly 142 described above. Rotation of the swing arm assembly 232 brings the swing arm assembly 232 into contact with the release 278 of the rebound latch 242 as shown in FIG. 16. The force of the swing arm assembly 232 is sufficient to overcome the bias of the spring 274 thereby rotating the rebound latch 242 about the pivot 272 in the direction of the arrow 284.

Figure 17:
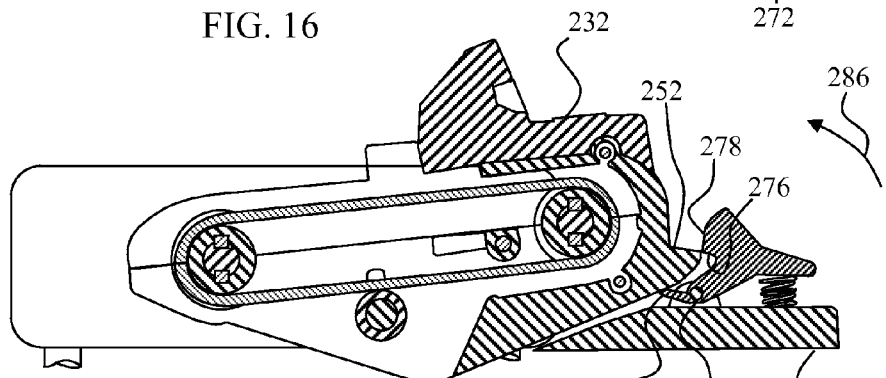
FIG. 17 depicts a partial cross-sectional view of the power tool of FIG. 11 with the swing arm assembly in contact with a latch foot on a rebound latch for automatically positioning the rebound latch to arrest rebounding of the swing arm assembly off of a stop pad.
Figure 18:
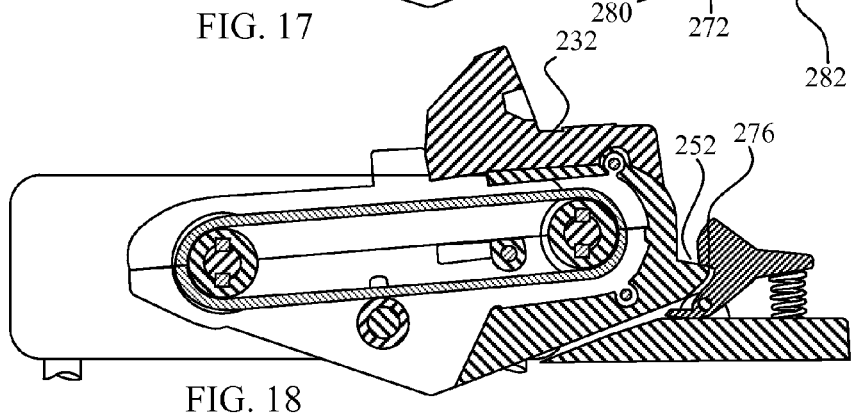
FIG. 18 depicts a partial cross-sectional view of the power tool of FIG. 11 with the swing arm assembly arrested from rebounding by the rebound latch.

Once the rebound latch 242 has rotated sufficiently, the swing arm assembly 232 slides past the release 278 and into contact with the latch foot 280 as shown in FIG. 17. Continued rotation of the swing arm assembly 232 forces the latch foot 280 downward, causing the rebound latch 242 to rotate in the direction of the arrow 286 of FIG. 17. As the rebound latch 242 rotates in the direction of the arrow 286, the rebound ledge 276 is rotated into a position above the latch plate 252 as shown in FIG. 18.

The swing arm assembly 232 then rotates into contact with the stop pad 282. In the event the swing arm assembly 232 begins to rebound off of the stop pad 282, the latch plate 252 moves into contact with the rebound ledge 276 and rotation of the swing arm assembly 232 is arrested.

Figure 19:
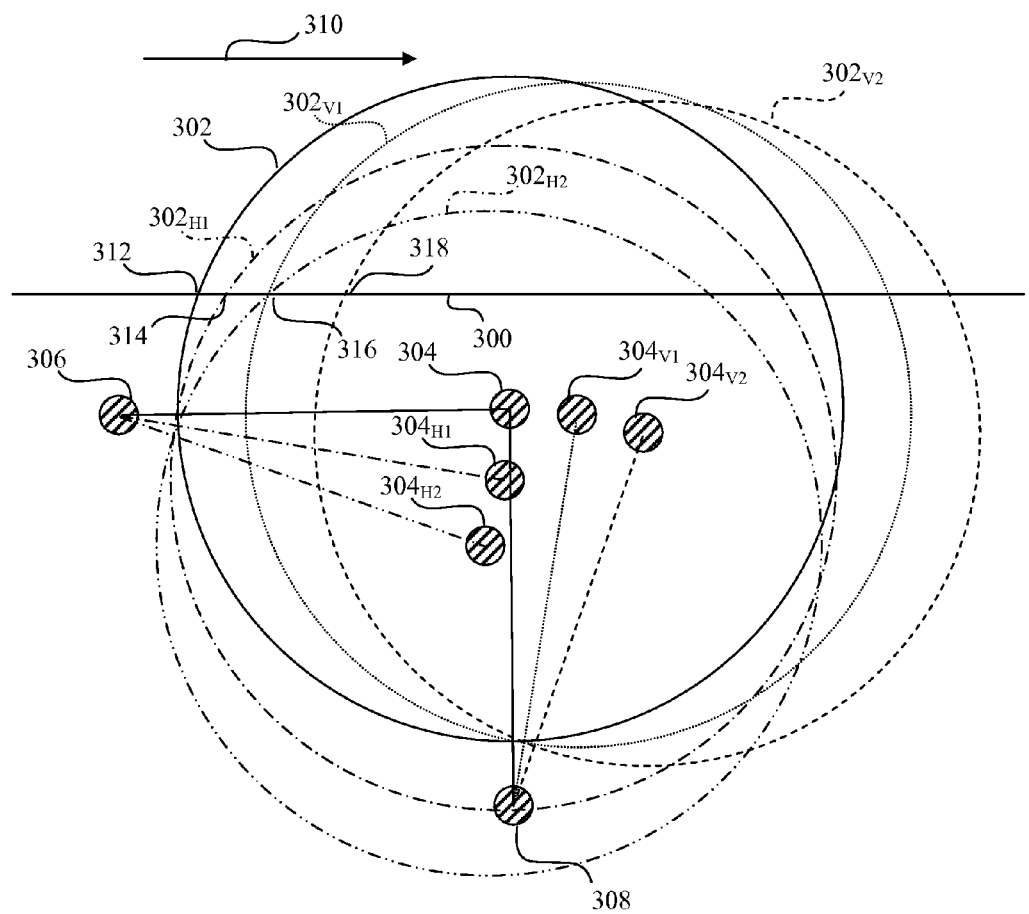
FIG. 19 depicts a schematic representation of the relative positions of a shaping tool as a horizontally mounted swing arm and a vertically mounted swing arm move a blade to a location beneath a work-piece support surface.

The vertical arm configuration of the tool 230 may be desirable in applications wherein injury is most likely to occur as a result of movement parallel to the surface of the work piece support surface. By way of example, FIG. 19 is a schematic of a work piece support surface 300 with a shaping device 302 extending above the surface of the work piece support surface 300. The shaping device 302 rotates about an axis defined by a blade wheel 304. In a horizontal swing arm configuration, the blade wheel 304 is driven by a power shaft 306. In a vertical swing arm configuration, the blade wheel 304 is driven by a power shaft 308.

A work piece, for purpose of this example, is moved by a user toward the blade 302 in the direction of the arrow 310. Thus, the point at which the user is most likely to come into accidental contact with the shaping device 302 is at or near the location 312. When accelerated such as by a solenoid 182, the blade wheel 304, in a horizontal swing arm configuration, rotates from the position indicated by the blade wheel 304 to the position indicated by the blade wheel $304_{H1}$ in a first time interval. The location of the shaping device 302 associated with the blade wheel $304_{H1}$ is blade $302_{H1}$. Thus, the blade 302 has moved from the location 312 to the location 314.

During the same time interval, the blade wheel 304, in a vertical swing arm configuration, rotates from the position indicated by the blade wheel 304 to the position indicated by the blade wheel $304_{V1}$. The location of the shaping device 302 associated with the blade wheel $304_{V1}$ is blade $302_{V1}$. Thus, the blade 302 has moved from the location 312 to the location 316. Accordingly, the blade 302 is moved farther away from the contact point 312 by the vertical configuration than by the horizontal configuration.

Likewise, the blade wheel 304, in a horizontal swing arm configuration, rotates from the position indicated by the blade wheel $304_{H1}$ to the position indicated by the blade wheel $304_{H2}$ in a second time interval. The location of the shaping device 302 associated with the blade wheel $304_{H2}$ is blade $302_{H2}$. Thus, the blade 302 has moved from the location 312 to the location 316 over two time intervals.

During the second time interval, the blade wheel 304, in a vertical swing arm configuration, rotates from the position indicated by the blade wheel $304_{V1}$ to the position indicated by the blade wheel $304_{V2}$. The location of the shaping device 302 associated with the blade wheel $304_{V2}$ is blade $302_{V2}$. Thus, the blade 302 has moved from the location 312 to the location 318. Accordingly, the blade 302 moves away from the contact point 312 by about a factor of two in the vertical configuration as compared to the horizontal configuration.

Thus, in applications wherein an injury is most likely to occur at one side of the shaping device, a vertically oriented swing arm may be used to mitigate injury. Most table saw applications will fit into this scenario if a blade guard is installed. FIG. 19 similarly illustrates that the horizontal swing arm configuration moves the blade downwardly at a faster rate. Thus, in applications wherein the injury is most likely to occur at the top of the shaping device, a horizontal swing arm configuration may be used to mitigate injury.

As described above, operation of the latch pin 254 is significantly different from operation of the latch pin 166. Specifically, the latch pin 166 is operated by applying a force to the swing arm assembly 142. In contrast, the latch pin 254 is relatively immune to activation by application of force to the swing arm assembly 232. Accordingly, the latch pin 254 is a positive locking mechanism that is not susceptible to unintentional unlocking absent complete failure of the latch pin 254. The latch pin 254 may thus be used in swing arms that are positioned in any desired orientation.

Figure 20:
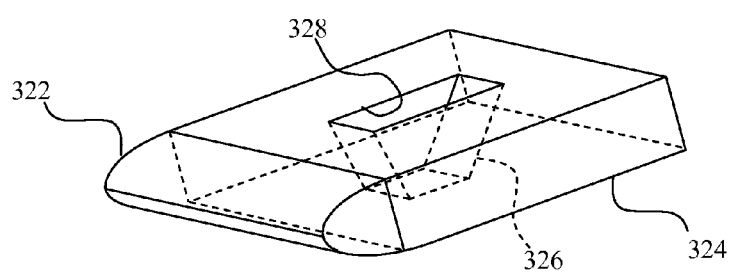
FIG. 20 depicts a perspective view of a positive locking mechanism which automatically aligns an actuating ramp with an actuator.

A variety of positive locking mechanisms, i.e., mechanisms wherein a latch is moved prior to application of rotational force to the swing arm assembly, may be incorporated into power tools. One example of another positive locking mechanism is the latch pin 320 of FIG. 20. The latch pin 320 includes a head 322 and a body 324. The latch pin 320 further includes an actuation ramp 326 within a bore 328. While the latch pin 320 is similar to the latch pin 254, the body 324 of the latch pin 320 is substantially wider than the cylindrical body 262 of the latch pin 254. Thus, the bore 328 of the latch pin 320 is easily maintained in alignment with a solenoid pin. Additionally, a non-cylindrical body such as the body 324 may provide enhanced alignment of the swing arm with which the body 324 is used.

Figure 21:
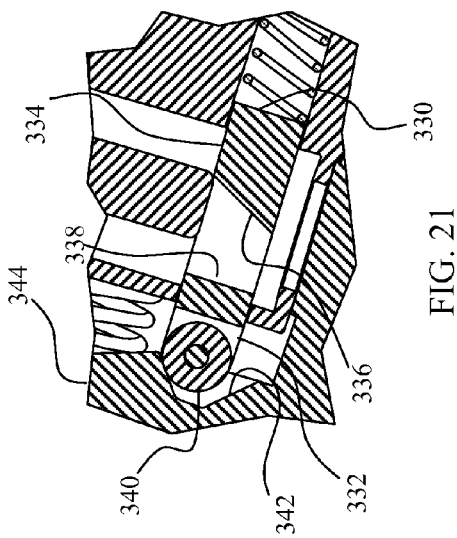
FIG. 21 depicts a cross-sectional view of a positive locking mechanism with a roller that reduces wear of the mechanism and which can be used to reduce movement of a latched swing arm assembly.

Another positive locking mechanism is the latch pin 330 of FIG. 21. The latch pin 330 includes a head 332 and a body 334. The body 334 may be any desired shape including rectangular or cylindrical. The latch pin 330 further includes an actuation ramp 336 within a bore 338. The latch pin 330 also includes a wheel 340 rotatably mounted in the head 332. The wheel 340 reduces wear on the latch pin 330. Additionally, the wheel 340 in this embodiment is configured to contact only one side of a recess 342 in a swing arm 344. Accordingly, by providing another member which limits the upward or counter-clockwise travel of the swing arm 344, the wheel 340 is used to "pinch" the swing arm 344 against the alignment member 500 to reduce or eliminate undesired movement of the swing arm 344.

Figure 22:
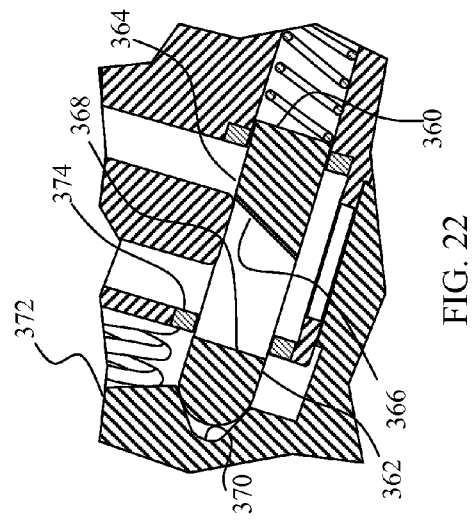
FIG. 22 depicts a cross-sectional view of a positive locking mechanism which can be used to reduce movement of a latched swing arm assembly.

Another positive locking mechanism is the latch pin 360 of FIG. 22. The latch pin 360 includes a head 362 and a body 364. The body 364 may be any desired shape including rectangular or cylindrical. The latch pin 360 further includes an actuation ramp 366 within a bore 368. The head 362, in this embodiment, includes a rounded contact portion 376 configured to contact opposing tapered sides of a recess 370 in a swing arm 372. Accordingly, seating of the head 362 in the recess 370 eliminates undesired movement of the swing arm 372 by biasing the swing arm 372 against the alignment member 500. Further reduction in non-axial movement of the latch pin 360 while permitting axial movement for locking and unlocking the swing arm 372 is provided by oil impregnated bushings 374. In one embodiment, the rounded contact portion 376 may be provided as a wheel coupled to an end of the latch pin 360.

Figure 24:
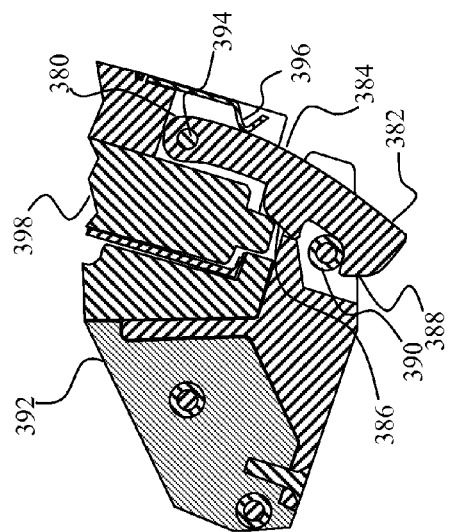
FIGS. 23 and 24 depict a positive locking mechanism which engages a pin in a swing arm assembly and with an actuation ramp extending from the body of the mechanism, and which rotates about an axis of rotation that is not parallel to the axis along which a solenoid pin moves.
Figure 23:
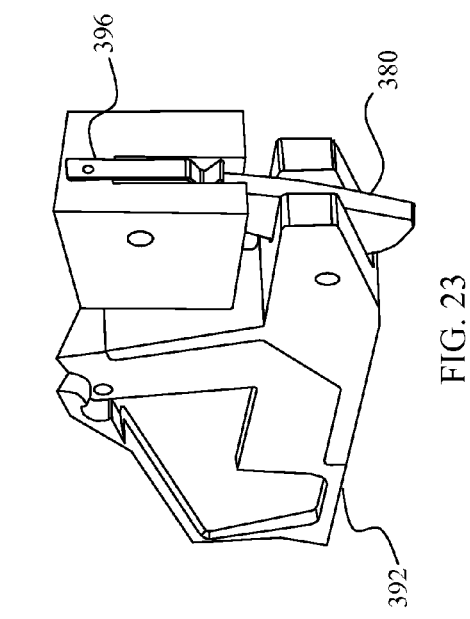

A positive locking mechanism may also be provided in the form of rotating latch pin such as the latch pin 380 depicted in FIGS. 23 and 24. The latch pin 380 includes a head 382 and a body 384. The latch pin 380 further includes an actuation ramp 386 extending from the body 384. The head 382 includes a hook portion 388 which engages a retaining pin 390 in a swing arm 392. The latch pin 380 is pivotably supported by a pivot pin 394 and biased toward the retaining pin 390 by a spring 396. When the hook portion 388 engages the retaining pin 390, the actuation ramp 386 is aligned with a solenoid pin 398.

In operation, movement of the solenoid pin 398 causes the solenoid pin 398 to impinge the actuation ramp 386 of the latch pin 380 imparting a rotational force to the latch pin 380. The actuation ramp 386 thus converts axial force from the solenoid pin 398 to a rotational force. The rotational force overcomes the bias of the spring 396 causing the latch pin 380 to rotate in a counterclockwise direction about the pivot pin 394. The shape of the hook portion 388 and the retaining pin 390 along with the location of the hook portion 388 relative to the pivot pin 394 is selected to ensure that an upward force is not imparted onto the retaining pin 390 from the latch pin 384 during this rotation. Once the actuation ramp 386 has rotated sufficiently, the solenoid pin 398 continues to move axially into contact with the swing arm 392.

Figure 25:
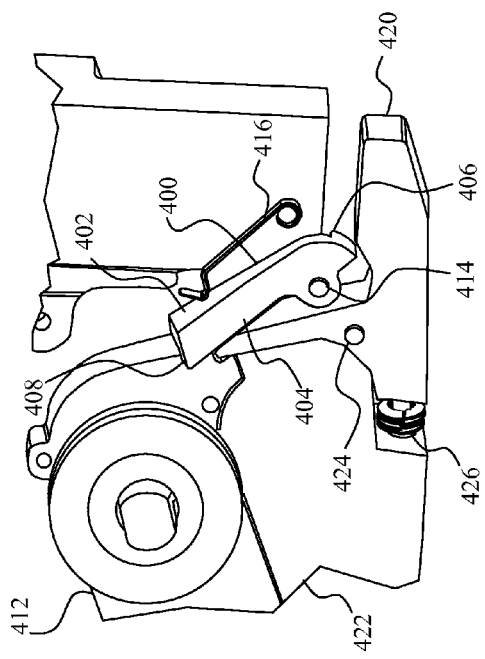
FIGS. 25 and 26 depict a positive locking mechanism which engages a recess in a swing arm assembly and with an actuation ramp defined in the body of the mechanism, and which rotates about an axis of rotation that is not parallel to the axis along which a solenoid pin moves.
Figure 26:
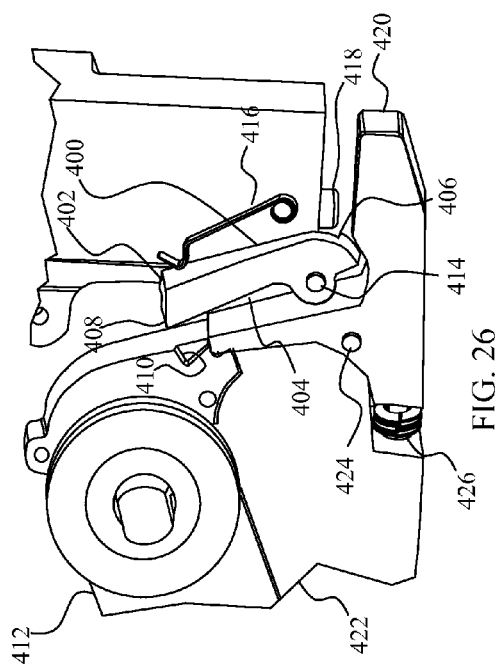

The latch pin 400 depicted in FIGS. 25 and 26 is another positive locking mechanism in the form of rotating latch pin. The latch pin 400 includes a head 402 and a body 404. The latch pin 400 further includes an actuation ramp 406 extending from the body 404. The head 402 includes a lip portion 408 which engages a retaining recess 410 in a swing arm 412. The latch pin 400 is pivotably supported by a pivot pin 414 and biased toward the retaining recess 410 by a spring 416. When the lip portion 408 engages the retaining pin 410, the actuation ramp 416 is aligned with a solenoid pin 418.

In operation, movement of the solenoid pin 418 causes the solenoid pin 418 to impinge the actuation ramp 406 of the latch pin 400 imparting a rotational force to the latch pin 400. The rotational force overcomes the bias of the spring 416 causing the latch pin 400 to rotate in a clockwise direction about the pivot pin 414. The shape of the lip portion 408 and the retaining recess 410 along with the location of the lip portion 408 relative to the pivot pin 414 is selected to ensure that an upward force is not imparted onto the retaining recess 410 from the latch pin 404 during this rotation. Once the actuation ramp 406 has rotated sufficiently, the solenoid pin 418 continues to move axially into contact with the swing arm 412.

The solenoid pin 418 in this embodiment impinges a strike plate portion 420 which is pivotably attached to a lower swing arm housing 422 by a pivot pin 424. Spring washers 426 positioned between the strike plate portion 420 and the lower swing arm housing 422 bias the strike plate portion 420 into a position aligned with the solenoid pin 418 when the lip portion 408 is within the retaining recess 410. When the solenoid pin 418 impacts the strike plate portion 420, the spring washers 426 are compressed thereby reducing the peak force that is transferred from the strike plate portion 420 to the other components of the swing arm 412. This allows lighter materials to be used for some components of the swing arm 412 while ensuring a rapid acceleration of the swing arm 412.

Figure 27:
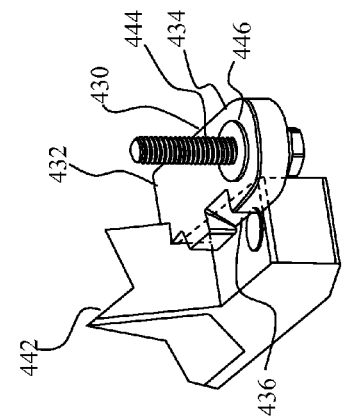
FIGS. 27 and 28 depict a positive locking mechanism which engages a recess in a swing arm assembly and with an actuation ramp defined in the body of the mechanism, and which rotates about an axis of rotation that is parallel to the axis along which a solenoid pin moves.
Figure 28:
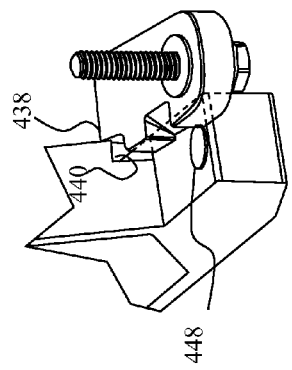

The latch pin 430 depicted in FIGS. 27 and 28 is another positive locking mechanism in the form of rotating latch pin. The latch pin 430 includes a head 432 and a body 434. The latch pin 430 further includes an actuation ramp 436 extending into the body 434. The head 432 includes a lip portion 438 which engages a retaining recess 440 in a swing arm 442. The latch pin 430 is pivotably supported by a pivot pin 444 and biased toward the retaining recess 440 by a radial spring 446. When the lip portion 438 engages the retaining pin 440, the actuation ramp 446 is aligned with a solenoid pin (not shown). If desired, a second latch pin, substantially identical to the latch pin 430, may be provided in opposition to the latch pin 430.

In operation, movement of the solenoid pin (not shown) causes the solenoid pin (not shown) to impinge the actuation ramp 436 of the latch pin 430 and the axial force is translated into a rotational force by the actuating ramp 436 imparting a rotational force to the latch pin 430. The rotational force overcomes the bias of the spring 446 causing the latch pin 430 to rotate in a clockwise direction about the pivot pin 444 and outwardly from the swing arm 442. Once the actuation ramp 436 has rotated sufficiently, the solenoid pin (not shown) continues to move axially into contact with a strike plate 448 on the swing arm 412.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A table saw, comprising:
a latch hold mechanism pivotable about a first pivot;
a swing arm pivotable about a second pivot different from the first pivot along a swing arm path between a first swing arm position and a second swing arm position;
at least one alignment plate positioned adjacent to a portion of the swing arm when the swing arm is in the first position;
a latch pin movable between a first latch pin position whereat the latch pin is operably engaged with the latch hold mechanism to bias the swing arm against the at least one alignment plate and a second latch pin position whereat the swing arm is not biased by the latch pin;
an actuating device configured to transfer a force to the swing arm when the swing arm is at the first swing arm position resulting in a bias on the latch pin in a direction toward the second latch pin position; and
a control system configured to control the actuating device to transfer a force to the swing arm when the swing arm is maintained at the first swing arm position sufficient to move the latch pin from the first latch pin position to the second latch pin position.

2. The table saw of claim 1, wherein:
the at least one alignment plate comprises a first alignment plate, a second alignment plate, and a third alignment plate;
the swing arm comprises a fourth alignment plate positioned in opposition to the first alignment plate when the swing arm is in the first position;
the swing arm comprises a fifth alignment plate positioned in opposition to the second alignment plate when the swing arm is in the first position; and
the swing arm comprises a sixth alignment plate positioned in opposition to the third alignment plate when the swing arm is in the first position.

3. The table saw of claim 1, further comprising a carriage movable with respect to a work piece support surface, wherein:
the swing arm is pivotably supported by the carriage; and
the at least one alignment plate is configured to be fixedly attached to the carriage.

4. The table saw of claim 3, wherein:
the table saw comprises an x-axis, a y-axis and a z-axis;
the second pivot is parallel to the x-axis;
the swing arm path extends along a plane defined by the z-axis and the y-axis; and
the at least one alignment plate is configured to align the swing arm about the z-axis.

5. The table saw of claim 4, wherein:
the at least one alignment plate comprises a first alignment plate, a second alignment plate, and a third alignment plate;
the swing arm comprises a fourth alignment plate positioned in opposition to the first alignment plate when the swing arm is in the first position;

the swing arm comprises a fifth alignment plate positioned in opposition to the second alignment plate when the swing arm is in the first position; and the swing arm comprises a sixth alignment plate positioned in opposition to the third alignment plate when the swing arm is in the first position.

6. The table saw of claim 5, wherein at least one of the first alignment plate, the second alignment plate, the third alignment plate, the fourth alignment plate, the fifth alignment plate, and the sixth alignment plate is angled at other than ninety degrees with respect to the x-axis within a plane defined by the z-axis and the x-axis.

7. The table saw of claim 1, wherein the swing arm comprises a recess with an upper surface, and the latch pin comprises a rounded contact portion, the table saw further comprising:

a biasing member configured to bias the rounded contact portion into contact with the upper surface of the recess.

8. The table saw of claim 7, wherein the rounded contact portion comprises a wheel.

9. The power tool of claim 1, wherein the latch hold mechanism is pivotably mounted to the swing arm.

10. A power tool, comprising:

an alignment member;

a swing arm movable along a swing arm path between a first swing arm position in contact with the alignment member and a second swing arm position spaced apart from the alignment member;

a latch hold mechanism mounted on the swing arm and movable with respect to the swing arm;

a latch pin movable between a first latch pin position whereat the swing arm is maintained at the first swing arm position and a second latch pin position whereat the swing arm is not maintained at the first swing arm position;

an actuating device configured to transfer a first force to the latch pin to bias the latch pin in a direction toward the second latch pin position, and, after transferring the first force, further configured to transfer a second force to the swing arm; and a control system configured to control the actuating device, wherein the power tool comprises an x-axis, a y-axis and a z-axis, the swing arm path extends within a plane defined by the y-axis and the z-axis, and the alignment member is configured to align the swing arm about the z-axis.

11. The power tool of claim 10, wherein:

the alignment member comprises a first alignment plate, a second alignment plate, and a third alignment plate;

the swing arm comprises a fourth alignment plate positioned in opposition to the first alignment plate when the swing arm is in the first position;

the swing arm comprises a fifth alignment plate positioned in opposition to the second alignment plate when the swing arm is in the first position; and the swing arm comprises a sixth alignment plate positioned in opposition to the third alignment plate when the swing arm is in the first position.

12. The power tool of claim 10, further comprising a carriage movable with respect to a work piece support surface, wherein:

the swing arm is pivotably supported by the carriage; and the alignment member is configured to be fixedly attached to the carriage.

13. The power tool of claim 12, wherein:

the alignment member comprises a first alignment plate, a second alignment plate, and a third alignment plate;

the swing arm comprises a fourth alignment plate positioned in opposition to the first alignment plate when the swing arm is in the first position;

the swing arm comprises a fifth alignment plate positioned in opposition to the second alignment plate when the swing arm is in the first position; and the swing arm comprises a sixth alignment plate positioned in opposition to the third alignment plate when the swing arm is in the first position.

14. The power tool of claim 13, wherein at least one of the first alignment plate, the second alignment plate, the third alignment plate, the fourth alignment plate, the fifth alignment plate, and the sixth alignment plate is angled at other than ninety degrees with respect to the z-axis a plane defined by the z-axis and the x-axis.

15. The power tool of claim 10, wherein the swing arm comprises a recess with an upper surface, and the latch pin comprises a rounded contact portion, the power tool further comprising:

a biasing member configured to bias the rounded contact portion into contact with the upper surface of the recess.

16. The power tool of claim 15, wherein the rounded contact portion comprises a wheel.

17. The power tool of claim 10, wherein the latch pin comprises an actuating ramp and a contacting portion, the power tool further comprising:

a biasing member configured to bias the latch pin toward the first latch pin position whereat the actuating ramp is axially aligned with the actuator and the contacting portion is in contact with the swing arm.

18. The power tool of claim 17, wherein the contact portion and the swing arm are configured to force the swing arm against the alignment member when the contacting portion is biased into contact with the swing arm.

* * * * *